Jan. 12, 1971    M. M. EISENBERG    3,553,913
TRIPLE GLAZED INSULATING GLASS WOOD SASH
Filed Sept. 10, 1969    2 Sheets-Sheet 1
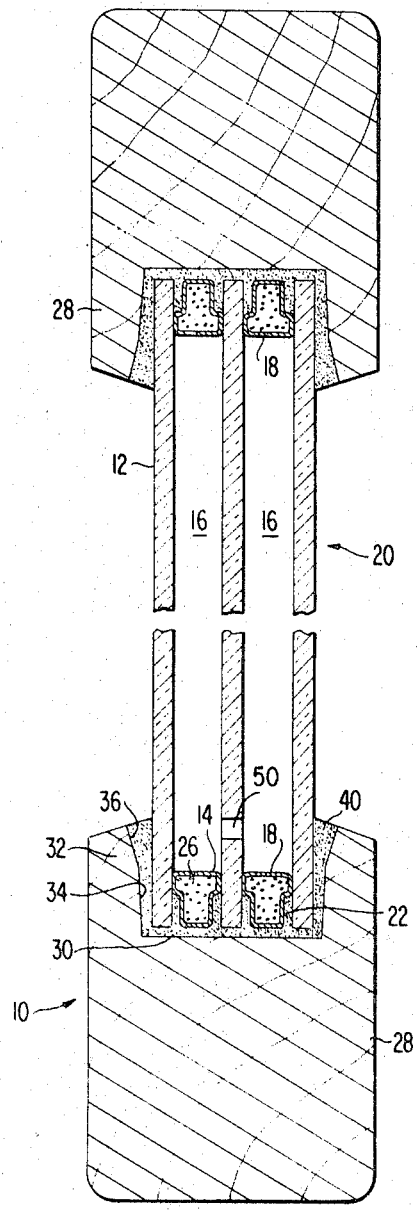
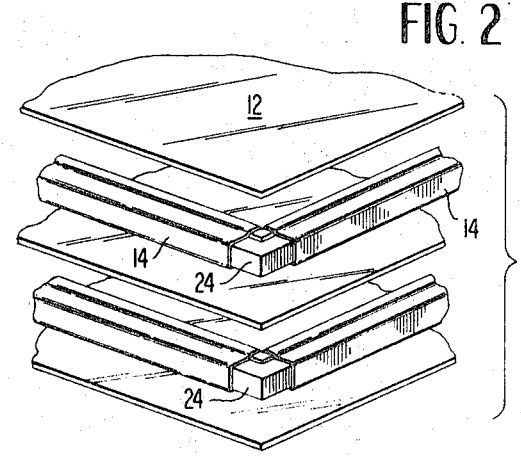
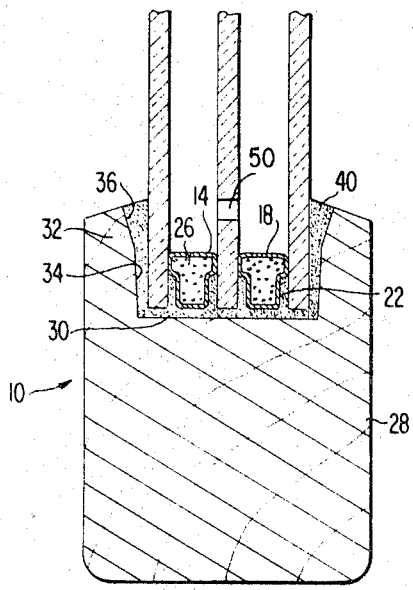
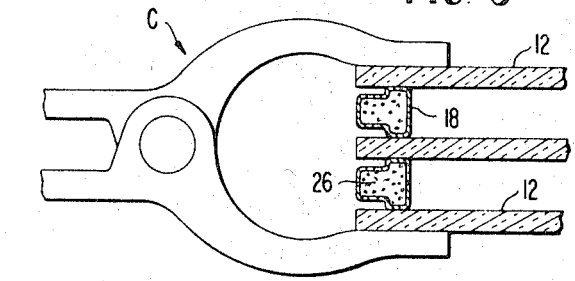
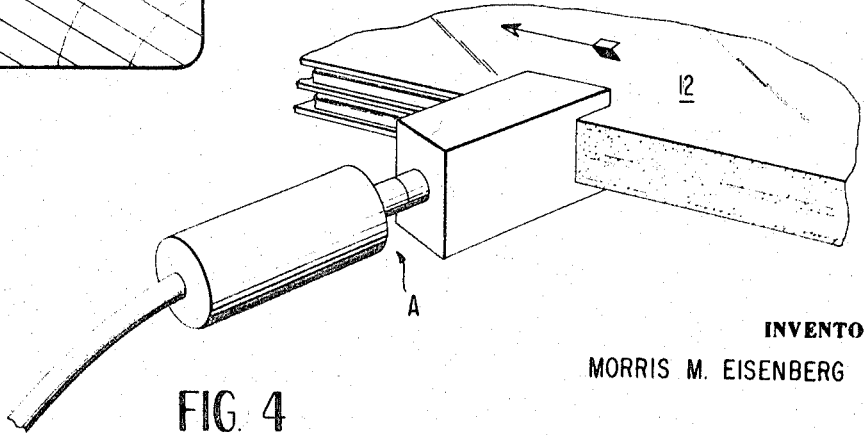
INVENTOR
MORRIS M. EISENBERG
BY    *Le Blanc & Shur*
ATTORNEYS United States Patent Office 3,553,913
Patented Jan. 12, 1971

3,553,913
TRIPLE GLAZED INSULATING GLASS WOOD SASH
Morris M. Eisenberg, Ste. Genevieve, Mo., assignor to Biltbest Corporation, Ste. Genevieve, Mo., a corporation of Missouri
Continuation-in-part of application Ser. No. 687,748, Dec. 4, 1967. This application Sept. 10, 1969, Ser. No. 856,630
Int. Cl. E04c 2/34; E06b 3/66
U.S. Cl. 52—172                8 Claims

ABSTRACT OF THE DISCLOSURE

Three panes of glass are spaced, one from the other, by hollow aluminum spacers disposed about the periphery of the panes to form a glass panel, each spacer being filled with a desiccant and comprising silica gel. A polysulfide compound is applied along the edges of the triple pane panel with the compound entering between the spacers and the panes. Before the compound sets, a wooden sash is applied about the edges of the triple pane and additional like compound is applied in glazing grooves on opposite sides of the glass panel between the outermost panes and the lips of the sash. The wood sash, glass, and aluminum spacers are thus bonded together.

This application is a continuation-in-part of application Ser. No. 687,748, filed Dec. 4, 1967, and now abandoned.

BACKGROUND OF THE INVENTION

The present invention relates to an insulating glass window assembly and particularly to a triple pane insulating glass wood sash assembly for windows and methods of forming the same.

Conventional insulating glass for wood window units usually comprises two sheets of glass separated by a dead air space, the glass being hermetically sealed in a wooden sash. A desiccant is often applied about the periphery of the glass in communication with the dead air space to maintain the latter in a dehydrated condition. Present day insulating glass window units are conventionally formed by means of glazing preassembled insulating glass panels into a wood sash by means of a caulking compound. The wooden sash in which these preassembled insulating glass units are inserted must have relatively thick wooden lips which surround the insulating glass panel on opposite sides thereof to prevent the wood from warping and breaking the glazing seal. For example, in applying a preassembled insulating glass panel into a standard 1⅜ inch wood sash, most window manufacturers employ a ⅜ inch thick insulating glass panel although a few have employed a somewhat thicker panel, on the order of ½ inch. These conventional window units accordingly usually employ glass panels and wooden sashes having a panel to wooden sash thickness ratio $$\left[ \text{Ratio} = \frac{\text{Glass Panel Thickness}}{\text{Wood Sash Thickness}} \right.$$

$$\left. \text{hereinafter referred to as } R = \frac{GPN}{WST} \right]$$

of about .27, with the thicker ½ inch glass panel providing a generally accepted upper limit of thickness ratio R of about .37. A thicker insulating glass panel providing a glass panel to sash thickness ratio R exceeding .37 necessarily decreases the thickness of the surrounding wood lips whereby the strength of the retaining lips would be seriously diminished permitting the sash to readily warp and buckle. This would cause the seal to be broken. Thus, glass panel to wood sash thickness ratios R in excess of .37 have been unacceptable.

Moreover, most insulating glass window units employ two panes of glass spaced one from the other by a dead air space. While multiple pane insulating glass panels have heretofore been employed in certain applications, widespread use of these panels in wooden window units has been inhibited by the foregoing considerations, as well as the necessity and desirability of maintaining the overall thickness of the wooden sash at a minimum. To increase the overall thickness of the insulating panel as by employing three or more panes would require a decrease in the thickness of the surrounding wooden lips for a wood sash of given thickness. To increase the overall thickness of the wooden sash in order to provide thicker wood lips about the increased width insulating glass panel has been proposed and this would provide sufficient strength to the wood lips to prevent warping and buckling. However, economic, aesthetic and installation factors have precluded such an approach.

By employing thinner glass or decreasing the thickness of the dead air space between adjacent panes of glass or both, an insulating panel of three or more panes may be formed having an overall thickness substantially equal to the conventional two-pane insulating panel. However, the expected increase in insulating properties of such panel by employing three or more glass panes is substantially offset by the diminished insulating properties occasioned by the reduction in thickness of the glass panes or the dead air spaces or both. However desirable a multiple pane insulating glass panel for window units may be, the problem of glazing the same into a wood sash having a given thickness in a manner providing sufficient wood in the sash to effectively preclude the sash from warping, buckling and breaking the glazing seal and without increasing the overall thickness of the window unit has been a problem to my knowledge heretofore unsolved.

SUMMARY OF THE PRESENT INVENTION

The present triple pane insulating glass wood sash assembly for window units comprises at least three glass panes spaced one from the other by a plurality of aluminum spacers disposed about the periphery of the panes, each spacer being hollow and containing a desiccant for dehydrating the dead air space between adjacent glass panes. The glass panes are glazed into the wooden sash without preassembly thereof. This is accomplished by applying a polysulfide sealant compound about the peripheral edges of the glass panes and spacers when positioned relative to one another to form a triple pane insulating panel. Before the polysulfide compound sets, the stiles and rails forming the wood sash are applied to the edges of the panel with the edges being received within a groove or rabbet formed along the inner edges of the wood sash. Additional polysulfide compound is then applied externally into the glazing grooves. The compound is then allowed to set and integrally bonds the wood to the glass and aluminum spacers whereby the wood lips are effectively reinforced to preclude warping and buckling thereof. Moreover, the polysulfide compound is very elastic material and, where slight warping of the sash as a whole occurs, the polysulfide sealant stretches but does not break the glazing seal and continues to maintain the strong wood, glass and aluminum bond.

By forming an insulating glass window unit in the foregoing manner, it has been found that the overall thickness of the insulating glass panel can be increased relative to the thickness of the wood sash to the extent that it is now possible to glaze a three glass pane insulating panel into a given wood sash with the ratio of the thickness of the panel to the thickness of the wood sash being on the order of .55. By increasing the thickness of the glass panel which can be inserted into a given wood sash, three or more panes of glass of standard thickness can be employed in the insulating glass panel without decreasing the overall thickness of the dead air space. In fact, by the present invention, the overall thickness of such dead air space can be increased to provide the present insulating glass panel with even greater insulating properties for a given thickness of sash. Moreover, this is accomplished without increasing the overall thickness of the wood sash, without increasing the tendency of the wood to warp under adverse weather conditions and without increasing the danger of breaking the glazing seal.

It has been found that a multiple glass pane window unit formed in the foregoing manner provides a window unit that is considerably stronger and sturdier than sashes employing the standard thickness insulating glass panel, for example, ⅜ to ½ inch thick, in a standard wooden sash, for example, 1⅜ inches thick. In fact, the window unit of the present invention is so sturdy and the sealant forms such a strong bond between the wood, glass and aluminum that the window units hereof cannot be repaired if one or more panes are broken. It is necessary, rather, to replace the entire sash. This sturdiness is attributable to the uniqueness of the present assembly as the polysulfide compound bonds the wood to the glass pane and aluminum spacers forming in essence a single integral connection therebetween. The glass and aluminum spacers mutually reinforce the wooden lips of the sash which are per se reduced in thickness from the lips of the conventional sash. The resistance to warping and buckling of the present insulating window unit assembly has been found to be greater than the resistance to warping of a conventional two pane insulating glass panel glazed into a standard wooden sash.

The insulating properties of the three pane window unit hereof are significantly increased in comparison with the standard width ⅜ or ½ inch insulating glass panel in a sash of identical thickness. The insulating value of the present insulated window unit has been found to be increased by at least one-third which is primarily due to the increase in the volume of the dead air space afforded by increasing the thickness of the panel, together with the separation of the dead air spaces by the middle glass pane. All of this is accomplished without an increase in the thickness of the wood sash and makes the present window unit a superior window insulator.

Moreover, condensation problems with a double pane insulating glass panel as normally occur under wide temperature differences across the panel are substantially eliminated within the full range of normally anticipated environmental conditions. For example, at 0° F. outside temperature and 70° F. inside temperature, ordinary double pane insulating panels employing two panes of glass each $3/32$ inch thick and having a dead air space between the panes of $3/16$ inch provides an inside glass surface temperature of 38° F. and a relative humidity of 31% at which condensation will occur. Utilizing the present triple glazed pane having three $3/32$ inch glass panes and two dead air spaces totaling $15/32$ inch and under the identical environmental conditions, the inside glass surface temperature is 51° F. and a relative humidity of 51% is required before condensation will occur. The latter is significant as a well insulated home should have 30 to 35% relative humidity during the winter months which means that condensation will occur in an anticipated environment utilizing the double pane panel whereas it will not when the triple pane panel is employed. Even at −30° F. outside temperature with a 70° F. inside temperature, the inside glass temperature for the present triple pane panel is 42° F. which requires a relative humidity of 37% before condensation will occur. Thus, even in this extreme weather condition, condensation will not occur if the usual inside relative humidity of 30-35% is maintained.

Additionally, by utilizing a triple glazed panel, the overall resistance to wind pressure, tending to bow, stress and ultimately break the glass pane, is substantially increased. The air buffer comprising the dead air spaces between the glass panes acts to cushion and reinforce the panes under the stress of wind pressure thereby providing a glass panel having high strength characteristics and a high resistance to breaking. It is a feature of the present invention that the pressure in the dead air spaces is equalized. An undesirable pressure differential across the dead air spaces would otherwise occur due to a thermal differential and/or volumetric changes due to wind or other pressures on the panel. This undesirable air pressure differential would decrease the panel strength, its resistance to bending or bowing, and most importantly diminish its insulating effect. To avoid these problems, a small hole or opening is provided through the middle glass pane to provide free communication and hence equalize the air pressure between the dead air spaces. The hole is formed in the corner of the window unit whereby visibility through the panel remains undistorted and uninhibited.

Accordingly, it is a primary object of the present invention to provide a multiple pane insulating glass wood sash assembly for window units having improved insulating properties.

It is another object of the present invention to provide a three pane insulating glass wood sash assembly for window units which is sturdy in construction and has a high resistance to warping and buckling.

It is still another object of the present invention to provide a three pane insulating glass wood sash assembly for window units wherein the ratio of the thickness of the insulating glass panel to the thickness of the wood sash is increased to over .5 and this without deleteriously affecting the resistance to warping and buckling or the overall strength and sturdiness of the sash.

It is a related object of the present invention to provide a three pane insulating glass wood sash assembly for window units which has high strength characteristics and which virtually eliminates problems caused by condensation within the usual and anticipated environmental range of use.

It is a further object of the present invention to provide a method of forming a multiple pane insulating glass wood sash assembly for window units having the foregoing characteristics.

These and further objects and advantages of the present invention will become more apparent upon reference to the following specification, claims and appended drawings.

DESCRIPTION OF THE DRAWING FIGURES

FIG. 1 is a cross sectional view of a multiple pane insulating glass wood sash window assembly constructed in accordance with the present invention and having portions broken away for ease of illustration;

FIG. 2 is an exploded fragmentary perspective view of the insulating glass panel employed with the window assembly hereof;

FIG. 3 is a fragmentary cross sectional view of the glass panel and illustrating the clamp maintaining the panel in assembled relation;

FIG. 4 is a fragmentary perspective view of the glass panel illustrated in conjunction with a tool for applying sealant along the edge portion thereof;

DESCRIPTION OF THE PREFERRED EMBODIMENT

Figure 5:
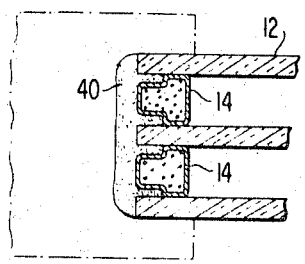
FIG. 5 is a cross sectional view of the glass panel illustrated with the sealant applied to the edge thereof.
Figure 6:
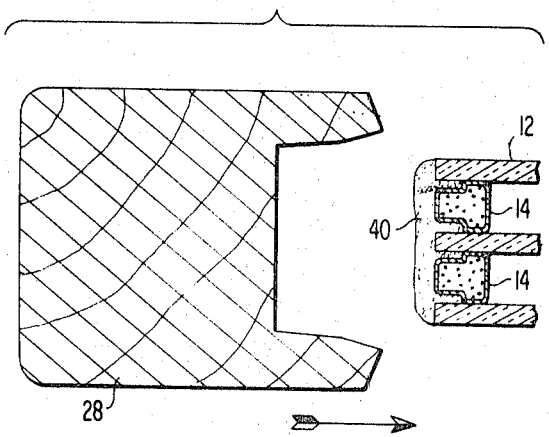
FIG. 6 is a cross sectional view of the wood sash and an edge of the glass panel prior to assembling the sash and panel.
Figure 7:
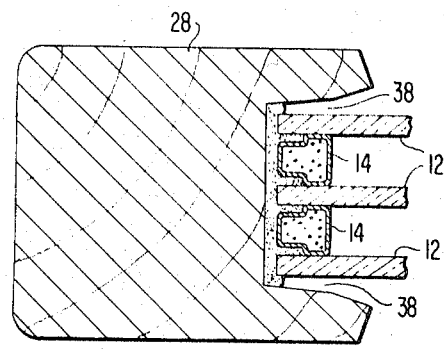
FIG. 7 is a cross sectional view of the wood sash with the edge of the glass panel received in the groove in the wood sash prior to final application of the sealant.
Figure 8:
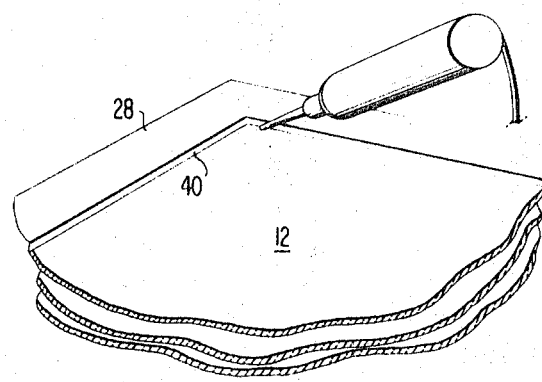
FIG. 8 is a fragmentary perspective view of the assembled window unit illustrating the application of the sealant in glazing grooves formed between the panel and the sash.

Referring now to the drawings and partciularly to FIG. 1 thereof, there is shown a three pane insulating glass wood sash window unit, generally indicated 10, comprising three sheets of glass 12 maintained in spaced relation one from the other by spacers 14 which define, with next adjacent pairs of glass panes 12, a pair of dead air spaces indicated at 16. Spacers 14 are made of sheet metal, preferably aluminum, pressed to form a substantially hollow generally T-shaped cross section as seen in FIGS. 1 and 3, with the longitudinally extending opposite edges of the sheet metal forming spacers 14 lying in opposed relation as at 18 inwardly of the periphery of the glass panel which is generally indicated 20. As seen in FIG. 1, the lateral walls 22 forming the base of the T-shaped cross section thereof are inset or indented to form a space between the lateral edges of the glass panes 12 and spacers 14 which space opens outwardly of panel 20 for reasons as will presently become clear.

In the standard rectangular window unit, four spacers 14 are arranged between each adjacent pair of glass panes 12 along the laterally facing peripheral edges thereof, each spacer 14 forming right angles with the adjoining spacers at opposite ends thereof. As seen in FIG. 2, the ends of adjoining spacers 14 are cut at right angles and right angle members 24, preferably zinc castings, may be inserted into the ends of the adjoining spacers to form a rectangular spacer framework when assembling the glass panel as will be described hereinafter. Spacers 14 are hollow and provide longitudinally extending receptacles encompassing the dead air spaces 16 between adjacent glass panes for receiving a suitable desiccant 26 having moisture absorbing properties, such as silica gel. The slits 18 between the opposed edges of the aluminum sheets forming spacers 14 provide suitable openings between the desiccant and dead air spaces 16 whereby the latter can be maintained in a dehydrated condition.

A wooden window sash 28 encompasses glass insulating panel 20 and comprises four rectangularly disposed wooden frame members formed to encompass panel 20. It will be understood that reference to a rectangularly shaped window unit is made herein for convenience of description only and that other window shapes may be constructed. Any suitable standard method of joining the wooden sash of the frames 28, one to the other, may be employed, such as mortised-and-tenoned or slotted construction and pinned, not shown. The inner edge of each frame member 28, which comprise the rails and stiles of the sash, is recessed to provide a groove or rabbet indicated at 30 extending the full length thereof and forming a pair of laterally spaced integrally extending wood lips 32. The inwardly facing lateral wall portions 34 adjacent the base portions of grooves 30 diverge slightly one from the other toward the groove openings and the lateral wall portions 36 adjacent the groove openings diverge one from the other at a greater angle. Groove 30 is formed sufficiently wide to receive the edge of glass panel 20 and defines therewith a pair of glazing grooves indicated at 38 formed between the outer most glass panes 12 and the lateral wall portions 32 and 34 on opposite sides of sash 28, for reason as will become apparent. A sealant 40 is applied between the edges of glass panel 20 and the wall portions of rabbet 30 in a manner to be described whereby wooden sash 28 is bonded to glass panes 12 and aluminum spacers 14 forming essentially a unitary integral connection.

To form the wood sash assembly of the present invention, spacers 14 are filled with desiccant 26 and arranged to form a pair of like rectangular frames by inserting the angle members 24 into the open ends of adjoining spacers 14. Spacers 14 are then arranged to lie between three glass panels of similar rectangular configuration such that the edges of the glass panes and the outer edges of spacers 14 lie substantially flush as seen in FIG. 3. The panel is preferably supported during assembly by an underlying support in contact with the center of the panel such that the peripheral edges of the panel are fully exposed. The panel is then clamped in assembled relation by a clamp indicated schematically at C in FIG. 3.

A sealant is then applied along the outer edges of the panel by a suitable applicator, indicated at A in FIG. 4, filling the spaces between peripheral edges of panes 12 and the inset portions 22 of spacers 14 and forming a layer of sealant along the substantially flush outer edges of panes 12 and spacers 14. The sealant preferably comprises a two-part polysulfide compound having a polymer base, such as manufactured by Thiokal Chemical Corporation. This has an extremely high adhesive quality and seals the spacers to the peripheral edges of glass panes 12 such that dead air spaces 16 are hermetically sealed. Before the polysulfide compound is set, the wood frame members 28 forming the sash are applied about the edges of panel 20 as by gently pressing members 28 against the panel edges which are received in rabbets 30. The layer of sealant applied along the flush edges of glass panes 12 and spacers 14 thus adheres to the base of the grooves 30. Suitable spacing blocks, not shown, may be employed to center the wooden frame members 28 relative to glass panel 20 such that glazing grooves 38 of equal width are formed on opposite sides of glass panel 20. Additional polysulfide compound is then pumped into glazing grooves 38 and the outermost portions of the sealant are smoothed in the usual fashion to form a continuation of the inner edge portions of frame members 28 as seen in FIG. 1. Both applications of sealant are then allowed to set forming an integral seal. In this manner, the wood frame members 28 are bonded to both the glass panes 12 and spacers 14 forming an essentially unitary integral connection therewith. The air spaces 16 between panes 12 are thus hermetically sealed. The sealant, however, when set, is sufficiently elastic to stretch rather than break when loading or other factors tend to bend, buckle or distort the wooden sash and glass panel window assembly.

It is a significant feature hereof that a thicker glass insulating panel can be applied to a wooden sash assembly of a given thickness than heretofore possible with the assurance that the glazing seal remains effective, that an extremely sturdy window unit is provided, that the assembly has a high resistance to warping and buckling, and that an insulating window unit is provided having increased and superior insulating qualities. It has been found that with the foregoing construction an insulator glass panel having a thickness up to 60% the thickness of the wooden frame member can be bonded to the wooden member and still achieve the above-noted results. In one embodiment of the present invention employing glass panes having a thickness of $\frac{3}{32}$ inch, a panel having an overall thickness of $\frac{3}{4}$ inch is effectively bonded to an integrally formed wooden frame or sash member having a standard $1\frac{3}{8}$ inch thickness and still achieves the foregoing noted results. This provides a panel to sash thickness ratio of about .55

$$\left[R = \frac{GPT}{WST} = \frac{3/4}{1\frac{3}{8}} \cong .55\right]$$

which is well above thickness ratios heretofore thought possible, i.e., .37 or less. In accordance with the present invention, panel to sash ratios R exceeding .37 and up to about .6 are readily obtained. Accordingly, the preferred embodiment provides a dead air space between adjacent panes of glass of approximately $\frac{7}{16}$ inch thick providing a total dead air space of almost $\frac{1}{2}$ inch. The foregoing construction thus provides a ratio of dead air space thickness within the insulating glass panel to wood sash thickness of about .35. By providing this proportionately larger dead air space without increasing the overall thickness of the wooden sash, in comparison with the thicknesses of the dead air spaces provided in insulating glass window units having like overall sash thicknesses, it can be seen that the temperature insulating qualities of the present insulating window unit are far superior to the window units heretofore available.

To equalize the air pressure between the air spaces 16, an opening or hole 50 is formed in the middle pane of the three glass panes to permit transfer of air from one space 16 to the other space 16. This equalizes the pressure on opposite sides of the middle pane. Otherwise, differences in pressure within spaces 16, either caused by temperature differences therein or bowing of the outer panes under the loading, would bow the middle pane thereby reducing the insulating value of the triple glazed panel.

The problems of condensation are virtually eliminated with the foregoing triple glazed glass panel in the usual anticipated environmental conditions. As noted previously, the recommended relative humidity of 30–35% in wintertime with an inside temperature of 70° F. would not be sufficient to cause condensation even at an outside temperature of —30° F. Thus, the triple glazed panel remains clear even under this extreme condition.

Accordingly, it is seen that the objects of the present invention are fully accomplished in that there is provided an insulating window unit having a significant increase in insulating properties without an increase in overall sash thickness of the unit. Moreover, the manner in which the window unit is assembled, whereby an integral wood, glass and spacer bond is formed, provides a sturdy window unit having a high resistance to warping and buckling. The elasticity of the sealant affords a high resistance to breaking the hermetic seal between the external environment and the dead air spaces whereby the insulating properties of these enclosed spaces are effectively maintained. Additionally, the foregoing window unit and manner of construction provides for significant economics in both the method of manufacture thereof and the cost of the several parts forming the same. Condensation problems and problems associated with decreased insulating values caused by variances in the dead air spaces under thermal and pressure differences are entirely avoided.

What is claimed and desired to be secured by United States Letters Patent is:

1. A multiple pane insulating glass window unit comprising a glass panel including at least three sheets of glass and means for spacing said sheets one from the other including a plurality of spacers engaging between laterally facing peripheral edge portions of next adjacent sheets of glass, said spacers extending about said peripheral edge portions to define an air space with and between each adjacent pair of sheets and forming panel edge portions with said glass edge portions, wood sash members joined one to the other and extending about the periphery of said glass panel, said sash members having grooves formed in and along their inner faces for receiving said panel edge portions, the ratio of overall lateral thickness of said glass panel to the overall lateral thickness of said sash member being about .55 and the ratio of the sum total distance between adjacent pairs of glass sheets defining the overall thickness of the air spaces therebetween to the lateral thickness of the wooden sash members being about .35, and sealant means within said grooves bonding said wood sash members to said glass sheets and said spacers forming a hermetic seal between said spacers and said peripheral glass edge portions about said air spaces, said sealant comprising a polysulfide compound having a polymer base.

2. A window unit according to claim 1 wherein each of said sash members has a pair of lip portions defining the opposite side walls of the grooved inner faces thereof, the inner walls of said lip portions diverging one from the other toward the inner face.

3. A window unit according to claim 1 wherein said spacers comprise hollow members, a desiccant received within said hollow members, inner portions of the laterally facing side walls of each of said spacers abutting said peripheral edge portions of said laterally facing side walls being inset from said inner wall portions to form an outwardly opening space between said outer side wall portions and said glass peripheral edge portions.

4. A window unit according to claim 1 wherein the intermediate glass sheet of said three glass sheets has at least one opening therethrough to provide communication between the air spaces on opposite sides of said intermediate glass sheet.

5. A window unit according to claim 4 wherein said opening is located adjacent a corner of said window unit.

6. A window unit according to claim 5 wherein each of said sash members has a pair of lip portions defining the opposite side walls of the grooved inner faces thereof, said opening in said intermediate glass sheet being located directly between the lip portions and within the groove of one of said sash members to provide substantially undistorted vision through said glass panel.

7. A window unit according to claim 1 wherein said sash members have a thickness of about 1⅜ inches and said panel has a thickness of about ¾ inch.

8. A window unit according to claim 1 wherein each of said sash members has a pair of lip portions defining the opposite side walls of the grooves inner faces thereof, at least one of the wood sash members including its lip portions comprising a unitary piece of wood.

References Cited
UNITED STATES PATENTS

| | | | |
|---|---|---|---|
| 2,038,725 | 4/1936 | Fox | 52—616 |
| 2,933,780 | 4/1960 | Shinefeld | 52—616 |
| 3,226,903 | 1/1966 | Lillethun | 52—616 |

FOREIGN PATENTS

| | | | |
|---|---|---|---|
| 531,078 | 8/1954 | Belgium | 52—616 |

OTHER REFERENCES

German Printed Application, Lipp, L17545, Dec. 27, 1956.

PRICE C. FAW, Jr., Primary Examiner

U.S. Cl. X.R.

52—616

PO-1050
(5/69)

UNITED STATES PATENT OFFICE
CERTIFICATE OF CORRECTION

Patent No. 3,553,913         Dated January 12, 1971

Inventor(s)   MORRIS M. EISENBERG

It is certified that error appears in the above-identified patent and that said Letters Patent are hereby corrected as shown below:

Column 1, the equation appearing between lines 59 and 64 should read $$\left[ \text{Ratio} = \frac{\text{Glass Panel Thickness}}{\text{Wood Sash Thickness}} \text{ hereinafter referred to as } R = \frac{GPT}{WST} \right] \text{ --}$$

Signed and sealed this 23rd day of March 1971.

(SEAL)
Attest:

EDWARD M. FLETCHER, JR.          WILLIAM E. SCHUYLER, JR
Attesting Officer                Commissioner of Patents